Nov. 26, 1935.  H. F. JOHNSTONE  2,021,937
APPARATUS FOR REMOVING SO₂ FROM FLUE GASES
Original Filed Dec. 8, 1930
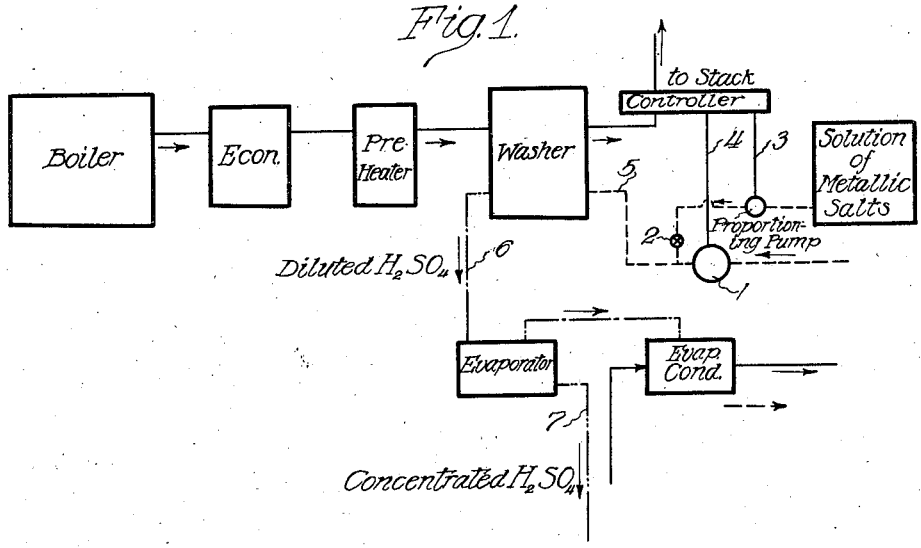
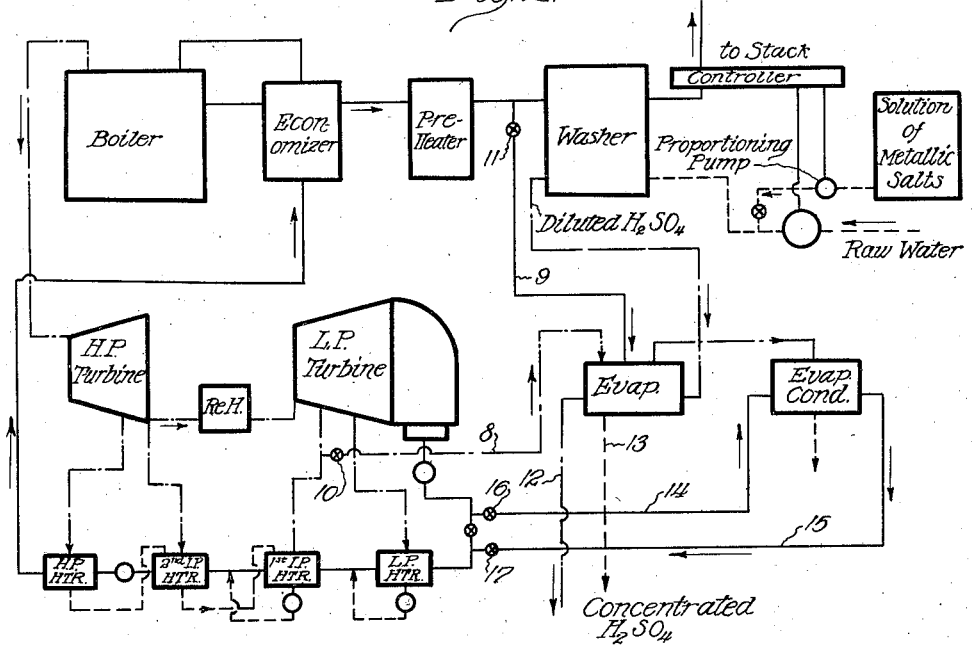
Inventor:
Henry F. Johnstone Patented Nov. 26, 1935

2,021,937

UNITED STATES PATENT OFFICE 2,021,937

APPARATUS FOR REMOVING SO₂ FROM FLUE GASES

Henry F. Johnstone, Urbana, Ill., assignor to Board of Trustees of the University of Illinois, Urbana, Ill., a corporation of Illinois Original application December 8, 1930, Serial No. 500,684. Divided and this application December 19, 1931, Serial No. 582,039

6 Claims. (Cl. 23—260)

This invention relates generally to an apparatus for treating flue gases and the like to remove obnoxious or harmful substances therefrom so as to render the gases substantially innocuous.

This application is a division of my copending application, Serial No. 500,684, filed December 8, 1930.

As pointed out in detail in my above identified copending application, the preferred embodiment of the present invention is concerned with the removal of sulphur dioxide from flue or stack gases, or from other gases containing sulphur dioxide.

Flue gases are ordinarily discharged through stacks or chimneys to the atmosphere. The annoyance which may be caused by the discharge of these gases depends on various factors, such as the height of the chimney or smoke stack, and on the constituents of the gases thus discharged.

The gases contain solid matter such as grit, soot and the like, and gaseous substances, such as sulphur oxides, which may prove highly detrimental due to their corrosive influence on objects in the vicinity. The atmosphere becomes polluted, and this pollution is manifest in various ways due to the precipitation of these harmful constituents of the flue gases upon the ground, buildings and upon the vegetable life.

The diffusion of the sulphur oxides in the air is of a different character than the diffusion of soot and grit. The latter falls to the ground in the form of ashes and dust particles. The sulphur oxides however, diffuse into the air like other gases and are carried with the air currents instead of precipitating to the ground like dust particles. These gases combine with the moisture and water vapor in the air and form sulphurous and sulphuric acids, which precipitate to the ground.

It is therefore a primary object of my invention to provide a novel process for washing and scrubbing the flue gases in order to remove the sulphur dioxide therefrom. Systems have heretofore been evolved for washing and scrubbing the flue gases with the object of removing the dust and grit. Such gas washers consist, generally speaking, of chambers through which the flue gases pass, having devices within the chambers for spraying the gases with water. The effect is a purification of the flue gases, resulting in a removal of air constituents and smoke. The sulphur dioxide content is also somewhat reduced in the process. However, because of the very small concentration of $SO_2$ and $SO_3$ in the flue gases, the concentration of $SO_2$ and $SO_3$ that may exist in the liquid is correspondingly small.

In attempting to remove the $SO_2$ and $SO_3$ from the flue gases by washing and scrubbing the gases with water, it is apparent that for the removal of these components from the very large volume of gas produced by a boiler furnace, a very large volume of water is necessary. Thus, it may be shown that for the removal of 75% of sulphur dioxide in the gases from one ton of coal containing 4% sulphur, 21,000 gallons of water would be required at 25° C. If the temperature of the water was 50° C., 57,300 gallons would be required.

This necessity for enormous quantities of water presents a serious obstacle and handicap in the way of devising an efficient washing method for removing the sulphur dioxide and sulphur trioxide from flue gases and from other gases containing sulphur. The percent of $SO_2$ removed from the gas mixture by pure water is initially high, but decreases rapidly as the concentration of $SO_2$ in the water increases.

Considering the problem of removing $SO_2$ by washing and scrubbing the gases, I have found that if the $SO_2$ dissolved in the water is by some means steadily removed, more and more $SO_2$ will be dissolved in order to satisfy the balance existing between the liquid and the gas phase of this constituent. If the removal of the $SO_2$ from the water takes place as fast as the gas is brought into contact with the liquid, the amount of water required would be reduced to a very small fraction of the values given previously.

I therefore intend to increase the solubility of sulphur dioxide in water to such an extent that the amount of water required for the removal of sulphur dioxide will make the process mechanically and economically feasible.

It is known that the flue gases contain, besides the $SO_2$, considerable amounts of oxygen, which, under suitable conditions, may combine with $SO_2$ to form $SO_3$. The latter is extremely soluble in water because it unites with water to form sulphuric acid.

I therefore have directed my efforts towards bringing about the reaction between the dissolved $SO_2$ and oxygen so that the amount of water required would be greatly reduced. I find that the rate of reaction between $SO_2$ and oxygen may be increased by the presence of minute quantities of certain metallic ions, or salts. Such an induced reaction is known as catalysis, and the inducer, which remains unchanged, is called a catalyst.

The effects of various metallic salts have been fully described in my copending application, which may be referred to in order to ascertain in detail the induced chemical reactions promulgated by the use of such a catalyst. Suffice it to say, that if the accumulating acid in the washing solution can be removed, the efficiency of the scrubbing is increased and much more gas can be washed with a given quantity of water.

My copending application describes in detail various means for removing the sulphur dioxide, and recovering certain by-products thereby.

It will be seen, from the above discussion, that the novel process for washing flue gases which I have invented, provides for adding to the washing water a small amount of a suitable metallic salt in order to increase the apparent solubility of sulphur dioxide to such an extent that the amount of water required for the removal of $SO_2$ is reduced to a point at which the washing process is mechanically and economically feasible. Also, considering the disposal of the sulphur dioxide removed from the gases, the same may be converted into sulphuric acid which may be disposed of commercially. Other by-products may be obtained, depending upon the catalyst used in the washing process.

Now, in order to show to those skilled in the art how my invention may be applied to practical use, I will describe a preferred embodiment of the present process with reference to the accompanying diagrams, in which;

Fig. 1 represents a simple cycle consisting of a washer, a tank containing a concentrated solution of metallic salt, a small amount of which is supplied to the washing water by means of a proportioning pump, and an evaporator; and Fig. 2 illustrates the coupling of the washing and scrubbing process with the steam cycle of an industrial plant, such as a power station.

A short description of the arrangements shown in Figures 1 and 2 will suffice for conveying an understanding of the operation of the novel gas washing and scrubbing process. The individual parts and mechanisms shown in the diagrams are labeled with designations which denote their functions. The functions of certain parts such as the boiler, economizer, preheater, etc., are assumed to be known, and the following discussion will therefore be limited to those parts which have particularly to do with the washing process and to the cooperation thereof with and within the systems shown.

Referring now particularly to Figure 1, I have shown a washer through which the gases pass on their way to the smoke stack or chimney. The flue gases are washed and scrubbed in this washer in order to remove the sulphur dioxide and other contents. The washing is accomplished by a solution of metallic salts automatically mixed with the raw water which is passed to the washer through a suitable pipe line. The metallic ions or salts bring about a rapid reaction between the dissolved $SO_2$ and oxygen as was described previously. The amount of water necessary for accomplishing the removal of $SO_2$ from the flue gases is thereby reduced to a practicable minimum. A meter designated by numeral I may be interposed in the pipe line feeding raw water. A valve 2 is shown interposed between the proportioning pump and the water pipe. When this valve is open, the solution of metallic salts can enter the water line and mix with the raw water which is being fed to the washer over the line 5.

The washer may be of the type and form disclosed in Patent No. 1,318,774 of October 14, 1919. The flue gases pass through a rotating disk and are spread out within the washer. The washing liquid enters the washer by a pipe line which directs the same upon the rotating disk, spreading the washing fluid laterally by centrifugal force and thereby providing a fluid curtain or screen through which the gases must pass. Solid particles will be eliminated from the flue gases within the washer and may be collected in a suitable hopper for removal from the washer such as a spray type of washer or a bubble type. However, any other type of washer, capable of effecting intimate contact between the washing liquid and the flue gases, may be used.

It will be understood that the amount of water and of the solution of metallic salts to be fed to and mixed with the raw water will be determined by the amount of volume of flue gases which pass through the washer in a given time. The contents of $SO_2$ in the flue gases may vary, depending on the coal burned. They will also be a factor in determining the amount of a given solution of metallic salts in the washing water. The proper mixing of the solution of metallic salts with the raw water, and the amount of water needed for a given condition (type of coal and amount or volume of flue gases for a given time) may be automatically regulated by a controller disposed in the funnel leading to the stack or chimney, as I have indicated in Figure 1.

This controller maintains connection with the proportioning pump over the control line 3 and with the meter I over the control line 4. Both the proportioning pump and the meter I, that is to say, the supply of raw water and of the solution containing the catalyst (metallic salt solution) will therefore be controlled automatically in accordance with the demand for either or for both. The operation of the controller may be determined by suitable adjustment according to the coal which is being burned. This adjustment is made prior to firing a certain grade of coal. The effect of the adjustment of the controller results in a predetermined mixture of washing liquid in accordance with the coal used, and the function of the controller during the firing of this coal will regulate the washing mixture in accordance with the volume of flue gases passing through the funnel which leads to the chimney. The controller may be located either as is shown, between the washer and the smoke stack, or it may be connected so that it precedes the washer.

This controller and proportioning pump for mixing the catalyst with the washing water in accordance with the volume of flue gas passing through the stack, and adjustable according to the percentage of sulphur in the coal burned, may be of the type shown in the September, 1929, issue of Industrial and Engineering Chemistry, published by the American Chemical Society, and which, on page 830, contains a description and illustration of a chemical proportioner suitable for this purpose. The adjustment as to percentage of sulphur may be automatically determined in accordance with the $CO_2$ content of the coal, since for any predetermined grade of coal the $SO_2$ content in the gas is proportional to the $CO_2$ content, which is readily determinable.

As a means of regulating the proportion of catalyst solution and raw water in accordance with the volume of gases and the quantity of $CO_2$ therein (which is a proportional indication of the quantity of $SO_2$) I may provide a compensator of the type shown on page 30 of Bulletin No. 660 of the Leeds & Northrup Company, published in 1930, in which a rheostat is varied in response to changes in the $CO_2$ content of the flue gases. The operation of the proportioning pump will be correspondingly varied in accordance with the rheostat variation. This, in conjunction with the operation of the controller as set forth on pages 3 and 5 of Bulletin L–661 of the same company, published in 1930, fully illustrates the manner in which the conversion of such a controller, which operates in response to $CO_2$ content in the flue gases, can be made to produce the desired control of a proportioning pump such as heretofore described.

If the washing solution is recirculated, the recirculation may be controlled by the concentration of sulphuric acid, or other by-produuct coming from the washer. That is, sufficient make-up is added continuously to compensate for the amount of solution removed. This proportion may be maintained by a device, the operation of which depends upon the electrical conductivity of the acidity of the washing solution.

Pipe line 5 is connected to the washer and feeds the washing mixture to the rotating disk within the washer which spreads the mixture and provides the liquid screen. The flue gases pass through this screen (an examination of the aforementioned patent will elucidate this action) and the solid particles will collect in suitable provisions, such as a hopper at the bottom of the washer. Due to the action of the catalyst in the washing water the solubility of $SO_2$ is increased and a rapid reaction is brought about between the $SO_2$ and oxygen. Diluted sulphuric acid ($H_2SO_4$) will leave the washer through pipe line 6, as indicated.

The diluted sulphuric acid may now be concentrated, for example by a process of evaporation. The evaporator shown in Figure 1 is assumed to be a direct-fired one. It yields concentrated sulphuric acid over the line 7. Further concentration may be accomplished by means of the evaporator condenser shown in the drawing.

Figure 2 shows one manner of coupling the washing process with the steam cycle. The washer used in this embodiment may be of the same type as employed in the previous example. Likewise, the tank for the solution of metallic salts and the connection to the water supply as well as the control for the mixing of the washing liquid may be the same. Bled-steam is supplied to the evaporator over the pipe line 8 in addition to the heat of flue gases supplied over line 9. These connections operate over valves 10 and 11, respectively, as shown. Concentrated sulphuric acid is obtained at 12. This cycle is feasible provided the heat used in the washing and concentration process is returned to the steam cycle in such a way as to compensate for the apparent loss in the regenerative cycle. The line 13 is connected to the regenerative cycle. The evaporator condenser may be connected to the regenerative cycle by means of lines 14 and 15 over suitable valves 16 and 17.

The concentration of sulphuric acid may be carried out differently if desired. As shown, the diluted sulphuric acid is concentrated by a process of evaporating the water. The problem of concentrating the diluted acid may, of course, be obtained from the standpoint of removal of the acid from the water, rather than the removal of water from the acid. My invention includes either possibility and is not limited to any specific proceduure.

It will be seen from the above description that I have invented a novel process of removing $SO_2$ from gases, which will be particularly useful in connection with industrial plants but is not limited to use in such plants. Simultaneously with the removal of $SO_2$, the gases are cleaned of other impurities. Sulphuric acid may be obtained as a by-product of the washing of the flue gases. The use of certain catalysts, such as iron, and the recirculation of the washing water over scrap iron will produce other by-products such as ferric sulphate or hydrogen.

Modifications of my invention may be devised, changing either certain functional steps or devising modifications in detail, or both, without adding to the scope of my disclosure. I therefore desire to have it understood that I do not intend to be limited strictly to the illustrated embodiment of the physical structure of my invention, otherwise than I have defined in the following claims.

What I claim as my invention is:—

1. In a system for removing obnoxious constituents including sulphur dioxide from flue gases, comprising a washer, means for passing said gases through said washer, pump means for feeding water to said washer, a tank containing a solution of metallic salts, means responsive to conditions in the gases exhausted from said washer and including a proportioning pump for controlling the quantity of said solution mixed with the water fed to said washer, separating means comprising an evaporator, means for conducting said washing water from said washer to said separating means, and means for removing one or more constituents of said washing water from said separating means.

2. In a power plant, a system for removing obnoxious constituents including sulphur dioxide from flue gases, comprising a washer, means for passing said gases through said washer, pump means for feeding a solution to said washer, a tank containing a solution of metallic salts, proportioning means controlled in accordance with the volume of the gases exhausted from said washer for metering the water fed to said washer, an evaporator, conduit means for conducting said washing water from said washer to said evaporator, and means for removing one or more constituents of said washing water from said evaporator.

3. In a power plant, a system for removing obnoxious constituents including sulphur dioxide from flue gases, comprising a washer, means for passing said gases through said washer, pump means for feeding a solution to said washer, a tank containing a solution of metallic salts, proportioning means controlled in accordance with the constituents of the gases exhausted from said washer for determining the quantity of said solution of metallic salts mixed with said water, an evaporator, conduit means for conducting said washing water from said washer to said evaporator, and means for removing one or more constituents of said washing water from said evaporator.

4. In combination, in a system for removing sulphur dioxide from gases containing the same, a boiler having a stack, a passage for conducting gases through said stack, a gas washer disposed in said passage, pump means for forcing water into said washer, a mixing tank containing a solution of a metallic catalyst, a controller responsive to the volume of gases passing through said stack, proportioning means responsive to said controller for mixing the solution from said tank with the water fed to said washer in predetermined proportion, said controller also determining the quantity of water fed to said washer, an evaporator, means for conducting the washing water from the washer to said evaporator, and a condenser connected to said evaporator for conducting vapors therefrom.

5. In combination, in a system for removing sulphur dioxide from gases containing the same, a boiler having a stack, means for conducting gases from said boiler to said stack, a gas washer disposed anterior to said stack in the path of said gases, a pump for forcing water into said washer, a tank containing a metallic salt in solution, a controller responsive to the constituents of the gases passing through said system and disposed posterior to said washer, a proportioning pump for mixing said solution from said tank into the water fed to said washer in proportions determined by said controller, an evaporator, a condenser connected thereto, and means for passing the water containing the dissolved sulphur dioxide from said washer to said evaporator.

6. In combination, in a system for removing sulphur dioxide from gases containing the same, a washer, means for passing said gases through said washer, pump means for feeding water to said washer, a tank containing a solution of metallic salts, means responsive to the rate of flow of said gases and to conditions in said gases and including a proportioning pump for controlling the quantity of said solution mixed with the water fed to said washer, separating means comprising an evaporator, means for conducting said washing water from said washer to said evaporator, and means for removing one or more constituents of said washing water from said separating means.

HENRY F. JOHNSTONE.